United States Patent [19]

Sanson et al.

[11] 4,116,736
[45] Sep. 26, 1978

[54] METHOD OF MAKING A FOAM PLASTIC CUSHION HAVING A PERIPHERAL FRAME AND AN EXTERIOR COVER

[75] Inventors: Joseph Sanson, Beaugency, France; Kurt Moser, Kirchheim, Fed. Rep. of Germany

[73] Assignee: The Upjohn Company, Kalamazoo, Mich.

[21] Appl. No.: 728,648

[22] Filed: Oct. 1, 1976

[30] Foreign Application Priority Data

Oct. 6, 1975 [DE] Fed. Rep. of Germany ....... 2544664

[51] Int. Cl.² ...................... B29C 13/00; B29D 27/04
[52] U.S. Cl. ..................................... 156/79; 156/245; 156/285; 264/46.8; 264/90; 264/92; 264/248; 264/309; 264/316; 264/46.6; 425/388
[58] Field of Search .................... 53/140, 183, 184 R, 53/185, 186; 425/324 R, 388, 504, DIG. 60, DIG. 207, 4 R, 387.1, 324.1; 156/79, 196, 245, 273, 285, 306; 264/46.4, 25, 46.5, 46.6, 46.8, 90, 92, 248, 313, 309, 45.5, 46.1, 46.7, 45.4, DIG. 14, 261, 263, 267, 250, 251, 94, 299, 316

[56] References Cited

U.S. PATENT DOCUMENTS

| 1,649,734 | 11/1927 | Roberts et al. | 264/90 |
|---|---|---|---|
| 2,760,562 | 8/1956 | Fisher | 5/355 |
| 3,008,859 | 11/1961 | Smack | 156/79 |
| 3,258,511 | 6/1966 | McGregor | 264/46.4 |
| 3,360,273 | 12/1967 | Hundt et al. | 264/267 |
| 3,608,055 | 9/1971 | Long | 264/90 |
| 3,755,040 | 8/1973 | Robinson | 156/285 |
| 3,932,252 | 1/1976 | Woods | 156/285 |
| 3,971,112 | 7/1976 | Amato et al. | 264/46.6 |

OTHER PUBLICATIONS

Dombrow, Polyurethanes, Reinhold (1965), pp. 135, 154 & 155.

Primary Examiner—Willard E. Hoag
Attorney, Agent, or Firm—St. Onge, Mayers, Steward & Reens

[57] ABSTRACT

A method and apparatus are disclosed for preshaping a sheet material, more particularly a textile and/or a plastic sheet, under differential pressure in a molding die, whereby to form a sack-like structure which becomes integrally incorporated as the cover of a foamed plastic cushion, vehicle seat, protective padding element or similar article, by the introduction of a self-foaming elastomeric material into the sack while it is being held in the molding die.

6 Claims, 8 Drawing Figures

METHOD OF MAKING A FOAM PLASTIC CUSHION HAVING A PERIPHERAL FRAME AND AN EXTERIOR COVER

BACKGROUND OF THE INVENTION

The invention relates to a method of and to apparatus for shaping a fabric or plastic sheet material in a suitable mold under differential pressure so as integrally to incorporate the shaped sheet as the cover or facing of a foamed plastic cushion, protective padding element or similar article. The sheet material may be plastic, fabric, or combination thereof, where in any event the material is naturally, or is made to be, non-pervious to passage of air through it so that it may be shaped in a suitable mold by differential pressure applied across opposite faces. The mold consists of cooperating molding dies of appropriate cavity configuration such that when a cover or facing sheet is supported in and shaped to conform to its respective molding die, two or more of these dies can be brought together to define a mold cavity completely lined by the cover sheets and forming an enclosure shaped to the desired configuration of the finished cushion, vehicle seat, dashboard padding, etc. The fabric or plastic sheet lined mold cavity is then injected with a self-foaming liquid plastic mix which expands in the enclosure to fill the same and provide the internal support for the finished product with its facing sheet integrally attached.

In the production of cushions as for example those for chairs, vehicle seats or the like, a method has been proposed (see German patent application No. S 32 875 VII 56a) in which a conventional foamed plastic material or rubber is filled into a casing made of rubber or non-hardening (thermoplastic) material to form a moss-like cushion composition in the casing. The casing or cover is placed in a suitable mold configured to the desired shape of the finished article, and the mold is charged with elastomeric filler material while the casing is supported in the mold, whereby to keep the outline of the cushion. The casing itself consists of two or more three-dimensionally preshaped pieces which in their original condition are simply cloth-like thin sheets. A disadvantage of this arrangement lies in the fact that a separate operation and apparatus are required to provide the preliminary shaping of the sheets into their desired configured form, something which represents additional labor requirements and increased complexity of production equipment. A further disadvantage of this prior production method resides in the fact that after gelling of the elastomeric material, it is not possible immediately to remove the finished cushion from the mold since subsequent processing is required, particularly as regards connection of the edges of the sheet members and subsequent trimming or finishing operations in respect to the junction at the part line of the mold.

In another method heretofore proposed involving a composite surfacing structure of fabric or the like, in which a thermally deformable textile sheet material made impermeable to air by an elastic coating on one of its surfaces, is laid across the open face of a molding die and the sheet material is then brought into snug engagement by differential pressure to conform with the configured mold wall, thereby forming a lining for that wall. A self-foaming elastomeric mix is then poured into the lined mold cavity and allowed to develop in the cavity. When the polymerization of the elastomeric material is completed, the resulting cushion is removed from the mold with the fabric or other facing sheet permanently attached to the foam.

Although this method of production avoids the disadvantage inherent in the previously mentioned method of separately preshaping the cover sheet, there is still a difficulty in that the production of even, uniform extension or stretch in the facing material of the finished cushion presents practical problems. That is, when the facing sheet is initially subjected to pressure differential to preshape it to the mold cavity, the whole area of the facing sheet is more or less evenly stretched; but only those regions corresponding to the shallower regions of the mold cavity are brought into actual contact with the surface of the mold in this initial stage. However when the fabric contacts the shallower regions of the mold cavity, those regions of the cover sheet become locked by friction against further extension in the mold, even though adjacent regions then undergo further extension or stretching in order to conform them to the deeper regions of the mold cavity. This leads as a result to different degrees of extension in different regions of the fabric and therefore to locally different thicknesses of the facing material on the finished cushion. In a finished product such as a cushion, therefore, it is just those parts which are subject to heaviest loading and wear which are covered by the thinnest regions of the facing sheet.

It has been proposed heretofore to overcome this difficulty and obtain an even thickness of the facing sheet throughout its surface by allowing the sheet to slide on the mold wall during the preshaping operation. However this is not readily possible, particularly in cases where the mold is highly configured to provide substantially different levels in depth of the cavity. Nor is it practical to incorporate liquid or powdered lubrication between the cover sheet and the mold wall to allow slipping to occur more easily, as this causes fouling of the exposed surface of the finished cushion. It may also produce clogging of perforations in the mold wall required to transmit differential pressure to the undersurface of the facing material.

In order to deal with or at least reduce the abovementioned difficulties, it has heretofore been suggested to use a mold plunger, or a number of such plungers, which preliminarily depress the fabric toward the lower or deeper levels of the mold cavity before application of differential pressure to the cover fabric or facing sheet. By the use of such mold plungers the fabric is subjected initially to a more-or-less even deformation throughout its area while giving it a preliminary shape configured more nearly to the ultimately desired shape. As a result, when the cover fabric is brought into final contact with the total mold surface by differential pressure, there is only a comparatively small further deformation then required, so that undue stretching of the cover fabric is largely eliminated. As will be readily apparent however in the foregoing procedure, additional equipment for premolding or shaping of the cover fabric is required and this is relatively complicated and expensive. Furthermore, use of such preforming plunger equipment does not lend itself to automated, continuous molding operations employed in a production line consisting of a plurality of identical molding dies continuously traveled about an endless conveyor which advances the dies through successive processing stations and operations.

It has also previously been proposed (see German patent application No. P 25 11 811.0) to employ an elastically deformable perforated membrane of varying thickness between the fabric and the mold wall, wherein regions of the membrane corresponding to the deeper levels of the mold contour are thicker than those of the membrane corresponding to shallower levels of the mold contour. Owing to this thickness variation, the membrane has a correspondingly variable stretch capacity in its different regions, and this produces a relatively even stretch or extension of the cover sheet while the latter is frictionally held in engagement with the surface of the membrane so as to prevent lateral movement between them during the shaping and molding operations. A disadvantage with that method, however, is that it does not provide means for producing a totally covered cushion; that is, a cushion having both a front and a rear facing sheet, in one molding operation.

SUMMARY OF THE INVENTION

It is a general object of the present invention to provide further improvements in the foregoing methods of manufacture of resilient cushions or similar articles, such that a completely finished product of integral construction is produced in one sequence of operations. This objective is achieved in accordance with the invention by initially forming in the molding die a completely closed sack or bag which ultimately comprises the entire cover or facing for the finished product. This sack is formed by joining separate, complementary facing sheets, of the same or different material, which are supported in a respective half-mold when the two mold halves are brought together. The respective facing sheets are then shaped by differential pressure in their respective molds to conform to the desired shape thereof. After this and while the shaped sack is still in the mold, a self-foaming resilient liquid polymeric resin mix is injected through a wall of the sack and is developed therein by chemical reaction to completely fill the mold cavity. In this manner, there is produced an integrally constructed cushion or similar product in completely finished double-faced condition in a single apparatus without need for preliminary or subsequent operations.

The sack can be comprised in part of sheet plastic, more particularly PVC film, and in part of a textile or textilelike material suitably treated to make it impervious; or it may be formed entirely of the same type of facing material. A method is thus available for producing a cushion product, such as an automobile seat in which the seat and backrest portions are composed of textile sheet material while the side and back surfaces of the structure are formed of PVC film. It is also possible to modify this arrangement so as to make different areas of the seat or back portion of one fabric and surrounding areas of a different material, as where for reasons of wear resistance this may be desirable.

In a further preferred embodiment of the invention, a pre-formed annular frame strip is disposed in the parting plane of the molding dies so as to be disposed around the periphery of the mold cavity at the point where the confronting facing sheets are joined. This frame strip is adapted to be welded into and permanently incorporated in the enclosed sack and provides a particularly smooth junction of the cover sheets and attractive appearance of the finished cushion at the weld seam.

In still another embodiment of the invention, the cover sheets are formed in place by spraying a suitable liquid elastomeric polymer directly onto the molding surfaces of the respective half-molds. After allowing this sprayed coating to become partially polymerized, the mold halves are brought together to form the enclosed molding cavity, and again this is injected with an elastomeric self-foaming polymerizable mix which sets up in the cavity to provide the body of the cushion or other structure. This method provides further simplification in fabrication since the cover sheets in this case are produced from liquid materials on site concommitantly with the production of the complete cushion.

The method of the invention is readily adapted to include provision for incorporating a reinforcing structure, such as a metal frame with or without coil springs, directly into the molded cushion so as to integrally incorporate the same therewith.

The apparatus for carrying out the method in accordance with the invention is characterized in that the molding die consists of two mold halves delimited by a mold wall such that when the two halves are mated, the die is closed on all sides. The mold may or may not be provided with an elastic membrane of the type heretofore known for assisting in controlling the stretching of the facing sheet during the molding operation. The membrane, if used however, can be of constant or locally varied thickness, and may be either perforate or imperforate.

In accordance with a preferred embodiment, a molding die is provided which employs two elastic imperforate membranes, one each for the respective die halves, wherein the exposed surfaces of the respective membranes are textured in order to produce, for example, a leather-like appearance on the surface of the finished cushion, etc. Such molding die is provided with a spray head by means of which suitable liquid polymeric material, more particularly a polyurethane elastomer, can be sprayed as a solvent-free liquid composition onto the respective membranes to form the facing sheets in situ in the mold itself.

In order to provide a more detailed explanation, reference is now had to the following embodiments described with reference to the accompanying drawings.

Figure 1:
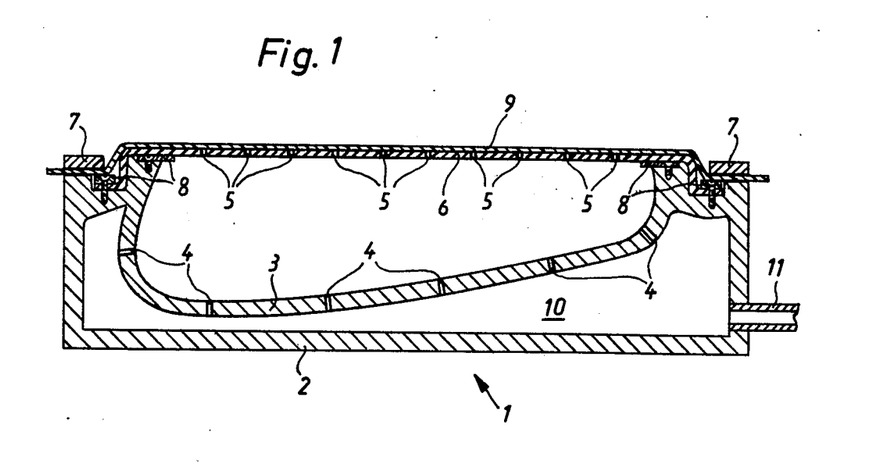
FIG. 1 shows diagrammatically a cross-section through a mold half comprising part of a molding die in accordance with the invention, wherein an elastic membrane is employed and a preformed facing sheet is clamped in position in the die ready for shaping.

In FIG. 1 of the drawings, one of the two mold halves of the mold is represented generally at 1 and comprises a mold box 2 having an internal mold wall 3 apertured to provide exhaust passages 4. The side or face of the mold half opposite to mold wall 3 is delimited by an elastic membrane 6 which is held securely by means of clamps 8 about the periphery of the mold box 2. Membrane 6 and the arched mold wall 3 accordingly define a hollow cavity. As here illustrated, membrane 6 is formed with perforations 5 which provide communication between the aforesaid cavity and the undersurface of a facing sheet 9 placed on the exposed surface of membrane 6. Sheet 9 is clamped in position by means of a frame 7 also on the periphery of the mold box. As here shown, membrane 6 is shown as being regularly perforated to provide passages 5; however, the membrane could be formed of suitable open-cell elastomeric material affording suitable porosity such that it is pervious to the pressure obtaining in the aforesaid cavity. Clamping frame 7 is adapted to be readily clamped in position and removed during the molding process to facilitate rapid application of the facing sheet and removal of the finished cushion, etc. at the completion of the molding operation.

In order to provide a pressure differential across the facing sheet in mold box 2, its interior space or cavity 10 below mold wall 3 is connected by conduit 11 to a suitable differential pressure source, such as a vacuum pump (not shown).

Figure 3:
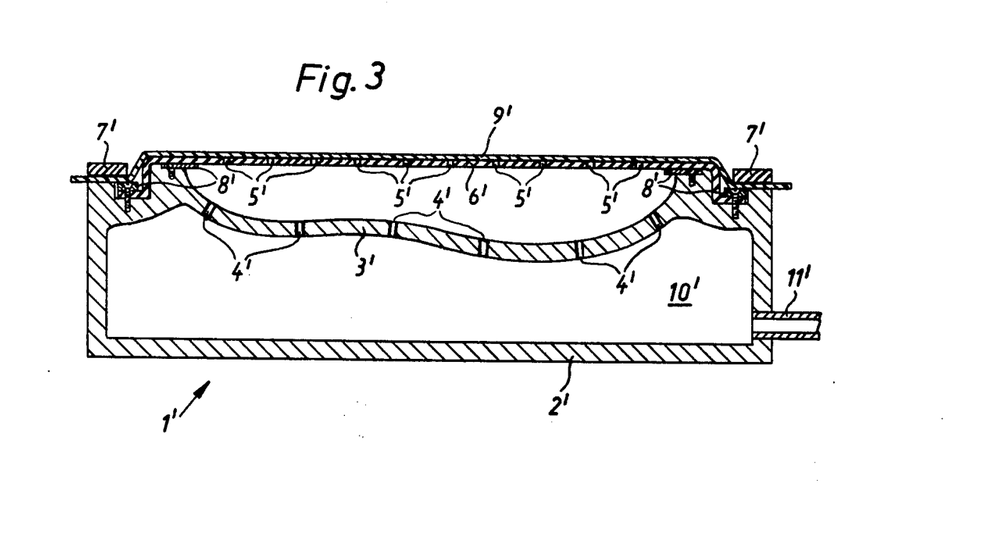
FIG. 3 is a diagrammatic cross-section through a complementary mold half adapted to be mated with that shown in FIGS. 1 and 2.

In FIG. 3 of the drawings the complementary half of the complete mold is shown, being represented generally at 1'. Apart from the shaping and arching of its mold wall 3', mold half 1' is identical with its complementary mold half 1 and the corresponding parts are accordingly designated by the same number but with a prime appended thereto.

Figure 2:
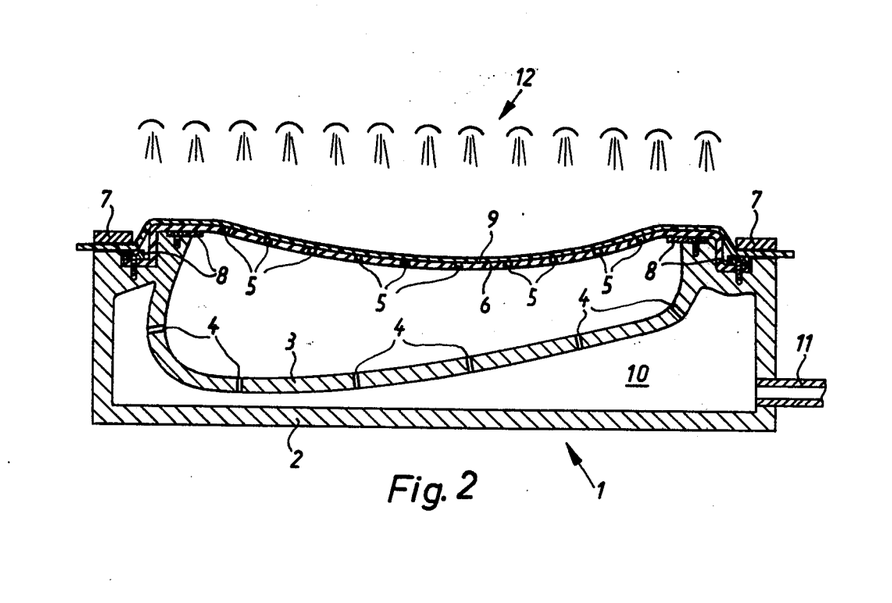
FIG. 2 is a similar view illustrating a subsequent stage in the molding process, wherein radiant heat is supplied together with differential pressure in preshaping the surfacing sheet.
Figure 4:
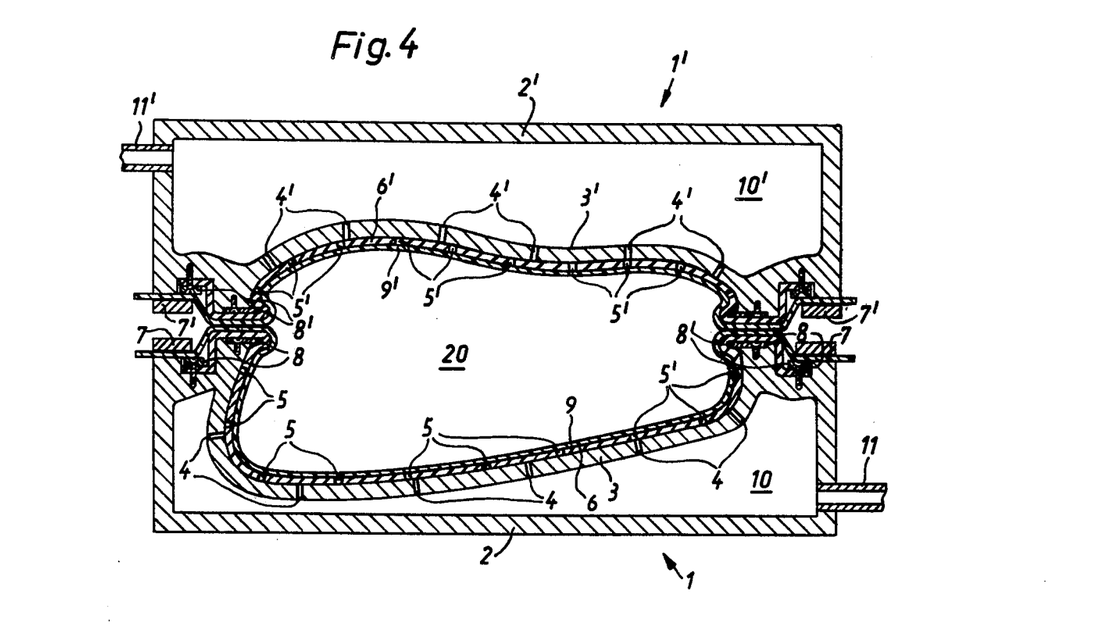
FIG. 4 is a diagrammatic cross-section through the complete mold, illustrating the two mold halves being held in face-to-face position wherein the respective facing sheets and resilient membranes are in final condition of preshaping in the mold immediately prior to introduction of a self-foaming elastomeric mix.

After the two facing sheets (e.g. PVC film) 9 and 9' have been clamped firmly on the respective perforated elastic membranes 6 and 6' of mold halves 1 and 1' by clamping frames 7 and 7', the shaping of the facing sheets may be initiated by application of vacuum to the respective molds and by simultaneously subjecting them to softening by radiant heaters 12, as represented diagrammatically in FIG. 2. As soon as the desired facing sheet temperature has been reached, the mold halves are pressed together in complementary, closed relation as shown in FIG. 4 so that the sheets become welded together at the periphery of the mold cavity. The shaping of the facing sheets to the configuration of the mold cavity is then completed by further application of vacuum to the respective mold halves, via conduits 11, 11'. As this shaping operation takes place, the facing sheets are constantly held in engagement with respective membranes 6 and 6' by the action of the vacuum transmitted through passages 5 and 5' of the respective membranes, and the interfacial friction thus developed between the membranes and facing sheets prevents any lateral movement between them during the forming operation. As a result the extension of the facing sheets is directly controlled by the extension or stretching of the diaphragms.

After the foregoing preshaping operation is completed, a suitable liquid polymeric self-foaming resin mix, for example a polyurethane mix, is introduced into the cavity 20, as for example by an injection needle (not shown) adapted to enter the enclosure in the parting plane of the die. As the self-foaming reaction takes place, the resilient foam developed completely fills cavity 20 and also forms a secure bond with the respective facing sheets throughout the area of contact.

Upon completion of the foaming reaction, the mold halves are parted and clamping frames 7 and 7' are removed, whereupon the finished cushion can be stripped from the mold. Thus the finished cushion comprises a core of foam material totally enclosed by PVC or other sheet facing material on all surfaces. Apart from trimming off any excess flash resulting from peripheral extension of the facing sheets at the parting plane, no further processing of the cushion is needed.

In the embodiment thus far described, membranes 6 and 6' are represented as having a constant thickness. Where greater degrees of deep drawing of the facing sheets is required, it is preferable to employ a membrane having a varied thickness throughout its area, such that the thicker membrane regions are disposed to correspond to those regions where the degree of drawing or cupping is greatest, as disclosed in prior German application No. P 25 11 811.0. On the other hand, if the degree of drawing is less than that represented in FIGS. 1 to 4, it may be possible to dispense with the use of either or both of the membranes, as described in prior German application P 25 00 365.0. Furthermore, one or both of the resilient membranes may be provided with a low surface profile or embossment on its exposed surface (i.e. the surface contacted by the facing sheet) to simulate in the finished product a leather-like appearance or other desired configuration.

It is also possible, in order to increase the structural strength of the finished cushion, etc., to incorporate a metal frame, with or without spring coils, directly into the cavity of the mold so that this frame assembly becomes fully embedded in the developed plastic foam. This same arrangement may also be used in conjunction with a further embodiment of the invention, described below, wherein a frame strip is employed in the fabrication of the initial sack structure comprising the facing of the finished product.

It is also possible to employ apparatus of the type illustrated in FIGS. 1 to 4 in conjunction with a conventional reactive polymer spray head, to afford further simplification of the method of producing cushions within the concept of the invention. In this case, the facing sheet material is produced in place directly on the respective membranes of the mold halves by spraying on them a suitable layer or film of plastic, more particularly a polyurethane elastomer, in the form of a solvent-free liquid composition, and allowing this to become adequately cured by polymerization to form a mechanically coherent skin. While these films or layers are still incompletely cured, the mold is closed to bring the die halves into confronting relation. The imcompletely cured facing sheets are thus brought into peripheral contact and chemically (and/or thermally) fused together at the periphery of the mold cavity during further curing operations. Following this, the interior cavity of the mold is filled with self-foaming elastomeric material and the remainder of the manufacturing operations are the same as those previously described.

In this last method of manufacture, the membranes employed in the die halves should not have any perforations; but of course they may be profiled to produce a replicated surface configuration in the finished product to simulate leather, etc. In this method of production, a suitable material for the supporting membranes to be used is a silicon rubber if the configuration of the finished product involves only a low degree of drawing or cupping. In those cases where higher degrees of drawing or cupping are encountered, a rubber-like ethylene-propylene-copolymer is preferred. These materials insure a ready and satisfactory separation from the polyurethane facing sheets produced in situ when the mold is subsequently opened and the cushion is stripped from the mold.

Figure 5:
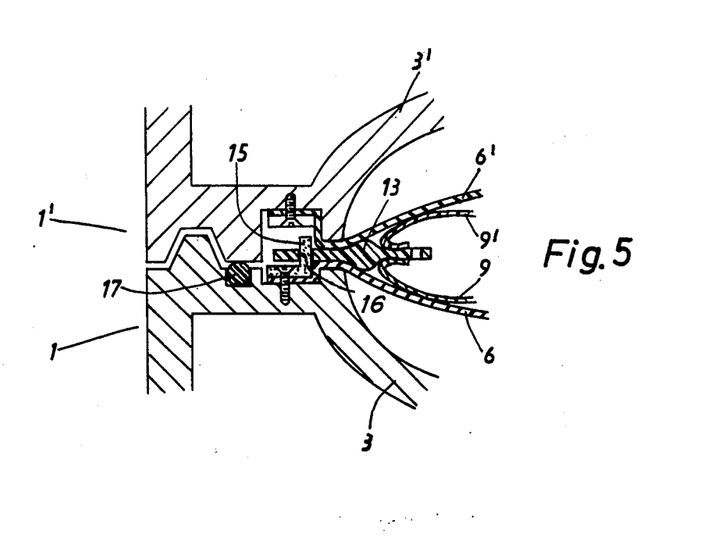
FIGS. 5 and 6 are fragmentary cross-sectional views of modified mold assemblies employing a resilient frame strip interposed in the parting plane of the mold for incorporation into the finished cushion, etc.
Figure 6:
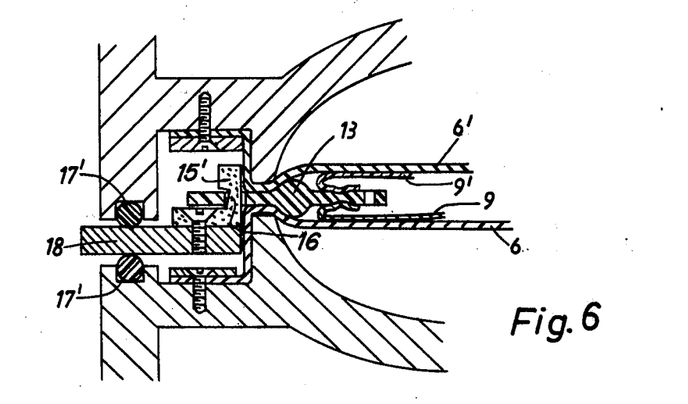
Figure 7:
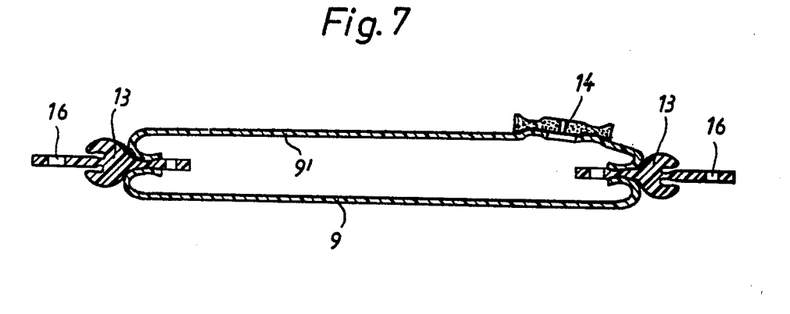
FIG. 7 is a cross-section of an auxiliary sack structure of the type incorporated in FIGS. 5 or 6.

Referring now to the embodiments shown in FIGS. 5 and 6, these illustrate the invention in conjunction with the incorporation of a frame strip 13 of molded elastomeric annular or washer-like design which is welded together with facing sheets 6 and 6' in a suitable mold to produce the sack which in this case incorporates an auxiliary inner sack structure shown in FIG. 7 having facing sheets 9 and 9'. By the use of the frame strip 13, a particularly smooth and pleasing appearance of the edges of the finished cushion, etc. is obtained. As here illustrated, the auxiliary sack structure of FIG. 7 incorporates a filling opening 14 through which self-foaming liquid plastic mix can be introduced separately from that introduced into the outer sack.

Employing this form of the invention, the auxiliary sack illustrated in FIG. 7 is positioned in one of the two mold halves which for this purpose is provided with lugs 15 adapted to be engaged in apertures 16 formed in the periphery of frame strip 13. Lugs 15 are disposed transversely, i.e. substantially perpendicularly, of the parting plane of the mold so that their free ends can engage the apertures of the frame strip and support it in the parting plane. In this case an O-ring seal 17 is provided for sealing the complementary mold halves 1 and 1', rather than relying on contact of membranes 6, 6' with opposite faces of the frame strip 13 for this purpose.

After the sack-like surfacing structure incorporating the frame strip 13 has been assembled in the mold as just described, and the mold closed, shaping of the facing sheets and development of the resilient foam filler takes place as described hereinabove in connection with FIGS. 1 to 4.

The arrangement shown in FIG. 6 is essentially similar to that of FIG. 5, the difference being that in FIG. 5 the mounting arrangement for the sack-like surfacing structure is particularly adapted to the situation where the sack is composed of one facing sheet of one kind of material, such as textile, while the rest is of a different material, such as PVC film. Where the sack structure is composed of PVC film on both faces, the arrangement is that employed in FIG. 6 wherein a metallic frame 18 is provided on which lugs 15' is carried. Such arrangement utilizing metallic frame 18 is of assistance in heating of the PVC film of the sack before this is introduced into the mold.

Figure 8:
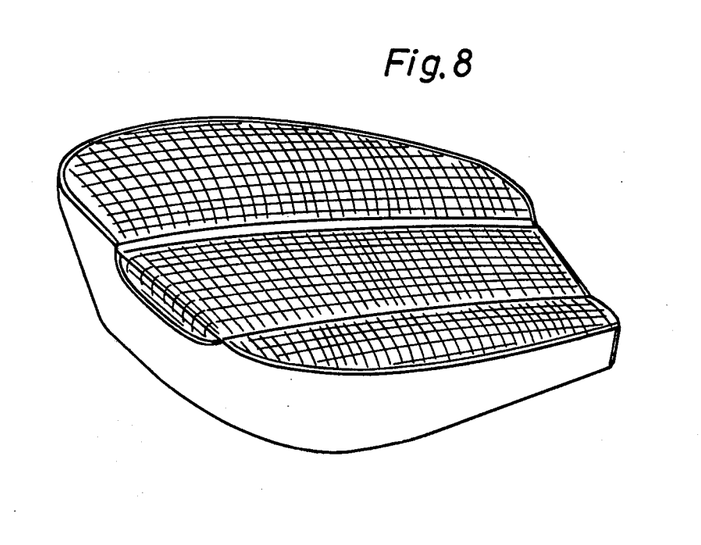
FIG. 8 is a perspective view of a finished seat cushion of the type produced by the apparatus.

FIG. 8 illustrates in perspective a finished cushion produced by apparatus as shown in FIG. 5, from which it can be seen that the seat surface or facing consists of textile or textile-like material, while the side, under and back surfaces of the seat (not shown) consist of plastic facing such as PVC film. The cushion represented in FIG. 8 is produced in its mold in substantially fully finished condition, apart from trimming off any flash or projection of frame strip 13, is used, on being removed from the mold.

Following previous conventional methods of manufacture for cushion surfacing structures, the auxiliary sack structure of FIG. 7 may also be produced by placing two pieces of fabric or film, formed into U-shapes, one inside the other like complementary box members, welding them together and then fixing them on one of the die halves. Although this enables deeper cushions to be produced, the local degree of deep drawing is nevertheless extremely low with the result that it is sometimes possible in this manner to dispense with a requirement for elastic membranes in the mold.

As will be gathered from the above description, the invention makes possible a substantial simplification and reduction in cost in the production of cushions, more particularly in the case of automotive and aircraft cushions having some degree of contour complexity.

What is claimed is:

1. In a method of forming a cushion or similar product comprising a resilient elastomeric foam and a sheet material facing enclosing said foam and integrally secured thereto, the steps which comprise:

providing complementary partible members of a mold wherein said members have molding surfaces defining in the closed condition of said mold a cavity configured to the desired shape of the finished product, said mold members being respectively provided with elastic membranes secured across their open faces and confronting said molding surfaces of said molding cavity;

spraying a solvent-free liquid elastomer onto each of said membranes to form a layer thereon, allowing such layers to become adequately cured by polymerization to form mechanically coherent facing sheets, and then bringing said partible mold members together to join said facing sheets peripherally of the mold cavity to form a closed sack of deformable, air-impermeable sheet material;

applying differential pressure to said mold to stretch said elastic membranes and said facing sheets formed thereon into conformity with said mold cavity;

introducing into said sack while thus conformed a self-foaming liquid polymer mix and allowing said mix to develop and fill said sack with resilient foam;

holding said foam-filled sack in said mold until said foam is sufficiently jelled and said sack walls are secured thereto; and parting said mold members and removing said foam-filled product in desired configuration completely encased in said sheet material facing.

2. In a method of forming a cushion or similar product comprising a resilient elastomeric foam and a sheet material facing enclosing said foam and integrally secured thereto, the steps which comprise:

providing separate, complementary, deformable air-impermeable facing sheets and supporting said sheets respectively in complementary partible members of a mold wherein said members have molding surfaces defining in the closed condition of said mold a cavity configured to the desired shape of the finished product;

engaging an annular plastic frame by means attached to one of said members and disposed about said cavity to position said frame with respect to said cavity;

closing said members with said sheets supported therein and peripherally uniting said plastic frame to said sheets to form a closed sack, and applying a differential pressure to said mold to stretch said facing sheets and force them into conformity with said mold cavity;

introducing into said sack while thus conformed a self-foaming liquid polymer mix and allowing said mix to develop and fill said sack with resilient foam;

holding said foam-filled sack in said mold until said foam is sufficiently jelled and said sack walls are secured thereto; and parting said mold members and removing said foam-filled product in desired configuration completely encased in said sheet material facing.

3. The method as defined in claim 2, wherein said sack is composed of deformable sheet members of the same or different material, including welding said frame strip into and permanently incorporating said frame into said sack when said mold members are brought into closed position to provide a smooth junction of said facing sheets.

4. The method as defined in claim 2, wherein said mold members are each provided with an elastic membrane secured across its face so as to be disposed between the molding surface of the mold cavity and the wall of said sack, and deforming said membranes elastically of the mold cavity under said differential pressure together with said sack walls during conformation thereof and the mold configuration.

5. The method as defined in claim 4, wherein said facing sheets are formed by spraying a solvent-free liquid elastomer onto each of said membranes to form a layer thereon, allowing such layers to become adequately cured by polymerization to form mechanically coherent skins before bringing said partible mold members together to join said skins and frame strip peripherally of the molding cavity to form said sack.

6. Apparatus for forming a cushion or similar product comprising a body of resilient elastomeric foam and a sheet material facing enclosing said foam body and integrally secured thereto, which comprises:

complementary, partible mold members having molding surfaces defining in the closed condition of the mold a cavity configured to the desired shape of the finished product;

an elastic membrane secured across the face of each of said partible mold members in confronting relation to the respective mold cavity therein, said membranes being adapted and arranged to deform elastically inwardly of their respective mold members upon establishment of a differential pressure in said molding members and to conform to said mold cavity configuration;

means associated with said partable mold members for supporting an annular plastic frame strip in the parting plane of said mold members, said supporting means comprising a plurality of lugs disposed to extend transversely of the parting plane peripherally about said mold cavity, said lugs being adapted to engage apertures in the periphery of an annular plastic frame strip and to support said frame strip substantially in the parting plane of said mold members intermediate said elastic membranes;

means for inducing a differential pressure in said molding members to cause said elastic membranes to be stretched into conformation with said molding surfaces; and means for introducing a self-foaming liquid polymeric mix through said mold members in said closed condition of the mold intermediate said elastic membranes.

* * * * *

UNITED STATES PATENT OFFICE
CERTIFICATE OF CORRECTION

Patent No. 4,116,736　　　　　　　　　Dated September 26, 1978

Inventor(s) Joseph Sanson and Kurt Moser

It is certified that error appears in the above-identified patent and that said Letters Patent are hereby corrected as shown below:

| | |
|---|---|
| Column 7, line 46: | Should read: |
| is carried | are carried |
| Column 7, line 58: | Should read: |
| is used | if used |
| Column 9, claim 4, line 23: | Should read: |
| and the | to the |

Signed and Sealed this

Fifteenth Day of May 1979

[SEAL]

Attest:

RUTH C. MASON
*Attesting Officer*

DONALD W. BANNER
*Commissioner of Patents and Trademarks*